United States Patent
Hawwa et al.

(10) Patent No.: US 6,856,489 B2
(45) Date of Patent: Feb. 15, 2005

(54) AIRFLOW ASSISTED RAMP LOADING AND UNLOADING OF SLIDERS IN HARD DISK DRIVES

(75) Inventors: Muhammad A. Hawwa, Fremont, CA (US); Jamshid Bozorgi, Fremont, CA (US); Aric Menon, Fremont, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 0 days.

(21) Appl. No.: 10/765,261

(22) Filed: Jan. 27, 2004

(65) Prior Publication Data

US 2004/0184194 A1 Sep. 23, 2004

Related U.S. Application Data

(62) Division of application No. 10/178,582, filed on Jun. 24, 2002, now Pat. No. 6,717,773, which is a division of application No. 09/473,506, filed on Dec. 28, 1999, now Pat. No. 6,437,945.

(51) Int. Cl.$^7$ .......................... G11B 21/12; G11B 21/22
(52) U.S. Cl. ..................................... 360/254.7; 360/234
(58) Field of Search ........................ 360/254.8, 255.7, 360/255.3, 254.4, 254.7, 254.2, 234

(56) References Cited

U.S. PATENT DOCUMENTS

| | | |
|---|---|---|
| 4,933,785 A | 6/1990 | Morehouse et al. |
| 5,324,004 A | 6/1994 | Richardson |
| 5,455,723 A | 10/1995 | Boutaghou et al. |
| 5,936,788 A | 8/1999 | Boutaghou et al. |
| 6,134,076 A | 10/2000 | Boutaghou et al. |

FOREIGN PATENT DOCUMENTS

JP 06-267218 9/1994

OTHER PUBLICATIONS

Levi et al., "Load/Unload Investigations On A Rotary Actuator Disk Drive," IEEE Transactions on Magnetics, vol. 28, No. 5, Sep. 1992, pp. 2877–2879.

Albrecht, et al., "Load/Unload Technology Finds Home in Mobile Drives," Data Storage, Sep. 1998, pp. 29–38.

*Primary Examiner*—Craig A. Renner

(57) ABSTRACT

Windage proximate to a spinning disk within a disk drive is directed through a plurality of apertures in a ramp situated near the outside diameter of the disk. A tab extending from a load beam that supports a slider rests on the ramp when the drive is not in use. When the drive is started the disk begins to spin and an actuator moves the load beam to bring the slider over the surface of the disk. As the load beam moves, the tab is guided along the ramp and cushioned by the air flow emerging from apertures in the ramp beneath it. When the drive is stopped the actuator brings the load beam back so that the tab engages the ramp. A cushion of air is again provided as the tab is moved along the ramp as the tab is returned to a parked position.

9 Claims, 10 Drawing Sheets

AIRFLOW ASSISTED RAMP LOADING AND UNLOADING OF SLIDERS IN HARD DISK DRIVES

CROSS REFERENCE TO RELATED APPLICATION

This application is a Divisional of U.S. application Ser. No. 10/178,582, filed Jun. 24, 2002, which issued Apr. 6, 2004 as U.S. Pat. No. 6,717,773, which is a division of U.S. application Ser. No. 09/473,506, filed Dec. 28, 1999 now U.S. Pat. No. 6,437,945, which is hereby incorporated by reference in its entirety.

BACKGROUND OF THE INVENTION

This invention relates generally to magnetic disk data storage systems, and more particularly to the use of a ramp to facilitate the loading and unloading of sliders.

Magnetic disk drives are used to store and retrieve data for digital electronic apparatuses such as computers. In FIGS. 1A and 1B, a magnetic disk data storage system 10 of the prior art includes a sealed enclosure or housing 12, a spindle motor 14, a magnetic medium or disk 16, supported for rotation by a drive spindle S1 of the spindle motor 14, a voice-coil actuator 18 and a load beam 20 attached to an actuator spindle S2 of voice-coil actuator 18. A slider support system consists of a flexure 22 coupled at one end to the load beam 20, and at its other end to a slider 24. The slider 24, also commonly referred to as a head or a read/write head, typically includes an inductive write element with a sensor read element.

As the motor 14 rotates the magnetic disk 16, as indicated by the arrow R, an air bearing is formed under the slider 24 allowing it to "fly" above the magnetic disk 16. Discrete units of magnetic data, known as "bits," are typically arranged sequentially in multiple concentric rings, or "tracks," on the surface of the magnetic disk 16. Data can be written to and/or read from essentially any portion of the magnetic disk 16 as the voice-coil actuator 18 causes the slider 24 to pivot in a short arc, as indicated by the arrows P, over the surface of the spinning magnetic disk 16. The design and manufacture of magnetic disk data storage systems is well known to those skilled in the art.

Reducing the distance between the slider 24 and the spinning disk 16, commonly known as the "fly height," is desirable in magnetic disk drive systems 10 as bringing the magnetic medium closer to the inductive write element and sensor read element improves signal strength and allows for increased areal densities. However, as the fly height is pushed to lower values, the effects of contamination at the head-disk interface become more pronounced. Specifically, debris may be collected over time on the air bearing surface of the slider 24 and which may ultimately cause the slider 24 to crash into the magnetic disk 16 causing the disk drive system 10 to fail. Consequently, reducing contamination within the sealed enclosure 12 is a continuing priority within the disk drive industry.

One strategy that has been used to reduce the debris that collects on slider 24 is to focus on the tribology at the head-disk interface to reduce the amount of contact between the slider 24 and the disk 16 when the system 10 is started and stopped. Traditionally, when a system 10 was shut down the slider 24 was parked on a track at the inner diameter (ID) of the disk 16 commonly known as a landing zone. There the slider 24 would rest in contact with the surface of the disk 16 until the disk was spun again, at which point the air bearing would form and the slider 24 would lift back off of the surface. Unfortunately, the friction and wear that occurred in these systems at the head-disk interface, even with improved lubricants, created unacceptable amounts of debris on the slider 24 to allow for still lower fly heights. In order to reduce friction and wear at the head-disk interface so as to reduce debris accumulation, the landing zone was improved by making it textured, often with a pattern of bumps, in order to reduce the contact area between the slider 24 and the disk 16, among other reasons.

Textured landing zones proved effective to a point; however, the need to fly the slider 24 still lower, with the inevitable need to reduce contamination further, led to the development of techniques whereby the slider 24 is held off of the surface of the disk 16 when not in use. Such techniques seek to avoid any contact between the slider 24 and disk 16 at all. However, simply lifting the slider 24 higher off of the surface of the disk 16 is not sufficient because a system 10 in a portable computer system is subject to shock that can cause the slider 24 to slap into the disk 16. Therefore, a technique used in the prior art to securely park the slider 24 away from the surface of the disk 16, as shown in FIG. 2, is to employ a small ramp 30 placed proximate to the outer diameter (OD) of the disk 16 and a tab 32 attached to the slider 24. As the voice-coil actuator 18 causes the slider 24 to move toward the extreme OD the tab 32 rides up on the ramp 30 and lifts the slider 24 away from the surface. The slider 24 is pushed still further along the ramp 30 past the OD of the disk 16 to be parked on a flat or slightly indented portion on the ramp 30.

FIGS. 3 and 4 serve to better illustrate the relationships between the components of ramp systems of the prior art. FIG. 3 shows an elevational view, taken along the line 3—3 in FIG. 2, of a slider 24 of the prior art suspended beneath a load beam 20 by a flexure 22. Attached to the end of the load beam 20 is a tab 32 intended to move in sliding contact with a ramp 30 for loading and unloading the slider 24. Although shown as attached to the end of the load beam 20, it should be noted that the tab 32 is typically formed as an integral part of the load beam 20.

FIG. 4 shows an elevational view, taken along the line 4—4 of FIG. 2, of the ramp 30 relative to the tab 32, read slider 24, and the disk 16, when the slider 24 is flying and the tab 32 is disengaged from the ramp 30. For clarity, the load beam 20 and the flexure 22 are not shown. The tab 32 has a rounded bottom surface to reduce the contact area with the ramp 30 when the two are in sliding contact. Arrows in FIG. 4 indicate the directions of motion of the load beam 20 for both loading and unloading.

One problem with a ramp 30 of this design is that the tab 32 is in sliding contact with the ramp 30 each time the system 10 is started or stopped. The sliding contact produces wear contamination that can be transferred to the disk 16 to be picked up by the air bearing surface of the slider 24. The wear may be reduced by shaping the tab 32 so that the surface that contacts the ramp 30 is convex and by employing a lubricant. Although the amount of wear debris formed in this way is less significant compared to that which is generated with textured landing zones, nevertheless it may interfere with the aerodynamics of the slider 24 at very low fly heights and lead to crashes.

Another problem encountered with ramps 30 is that the slider 24 is not entirely parallel to the surface of the disk 16. Rather, the leading edge of the slider 24, the one facing into the direction of the rotation of the disk 16, is higher than the trailing edge of the slider 24 to provide lift. Viewed another way, the pitch on the slider 24 causes the trailing edge to be closer to the surface. Similarly, since the air flow under the side of the slider 24 nearest the OD is always greater than under the side nearest the ID, the slider 24 may have some roll such that the ID edge of the slider is lower than the OD edge. Consequently, the corner of the slider 24 on the ID side of the trailing edge is commonly closest to the surface. As a slider 24 is loaded over a disk 16 the tab 32 slides down the ramp 30 until the lift experienced by the slider 24 is sufficient to cause the slider to fly.

What is desired, therefore, is a way to park the slider 24 on a ramp 30 while minimizing as much as possible the wear between the tab 32 and the ramp 30. It is further desired to provide a smoother transition during loading and unloading.

SUMMARY OF THE INVENTION

The present invention provides for a ramp to assist the loading and unloading of a slider in a magnetic disk drive. The ramp comprises a body having a first surface and a second surface and a plurality of apertures extending between them, where each aperture has a first opening at the first surface and a second opening at the second surface. The first surface of the ramp further comprises a sloped segment and a straight segment, with the sloped segment being acutely angled with respect to the second surface. The ramp of the present invention directs a portion of a flow of air proximate to a spinning disk through the apertures in order to lift and cushion a tab attached to a load beam from which a slider is also suspended.

In a preferred embodiment of the present invention the air flow emerging through the first openings is sufficient to suspend the tab above the surface of the ramp. By maintaining an air bearing between the tab and the ramp while the slider is loaded and unloaded, wear and contamination from sliding contact can be greatly reduced. Another advantage realized by the present invention is that an air bearing can smooth the transition both as the tab leaves the ramp during loading of the slider, and as the tab re-engages the ramp during unloading.

In other embodiments the air flow emerging through the first openings is not sufficient to hold the tab completely off of the surface of the ramp. In still other embodiments the air flow emerging through the first openings is sufficient to hold the tab completely off of the surface of the ramp only over some length of the ramp such as the sloped segment. These embodiments still provide an advantage over the prior art in that any lift at all that is provided to the tab will tend to reduce the contact force between the ramp and the tab. Any reduction in the contact force will further tend to reduce wear and contamination from sliding contact. The lift provided to the tab in these embodiments, although not enough to suspend it completely off of the surface of the ramp, nevertheless can also smooth the transitions as the tab engages and disengages from the ramp.

Further embodiments of the ramp are directed at variations of the second surface. The second surface may be flat, but in some embodiments the second surface is non-planar and shaped to better urge a flow of air proximate to the surface of the disk into the plurality of apertures. For example, the second surface may be concave or may be provided with an aerodynamic shape. Shaping the second surface is advantageous to the present invention in that it provides a greater air flow into the plurality of apertures thus providing a greater lifting force against a tab situated above the first surface.

Still other embodiments are directed towards the apertures themselves. Each aperture has a first and second opening and in some embodiments their cross-sectional areas are substantially equal. In other embodiments the cross-sectional area of the first opening is less than the cross-sectional area of the second opening. In further embodiments the apertures are substantially straight, while in others they take complex paths through the body of the ramp. For example, an aperture may have an S-shape. Yet other embodiments are directed towards apertures that intersect the second surface at an angle to a tangent of the second surface at the location of the aperture's second opening. Still more embodiments are directed to apertures that branch within the body of the ramp such that a second opening may connect to more than one first opening. Yet other embodiments are directed to apertures having nozzles formed at their first openings. Finally, some embodiments are directed to the cross-sectional shapes of the first and second openings and to the arrangements of the openings on the first and second surfaces.

The embodiments directed at different aperture configurations are advantageous in that they allow an air flow to be collected in a first location, say over the OD of the disk, to be redirected to a second location that is not directly over the first location, such as the straight segment of the ramp. These embodiments also allow the air flow out of the apertures to be shaped and otherwise manipulated, for example by providing nozzles to increase the speed of the air flow. Such variations provide greater lift to a tab over some regions of the ramp than over other regions. A properly shaped aperture can reduce turbulence and thus reduce resistance to the flow of air.

More embodiments are directed at ramp systems for loading and unloading at least two sliders. Such an embodiment comprises a body having a first portion and a second portion where each portion is a ramp as described above, and the first portion is proximate to a first surface of a disk and the second portion is proximate to a second surface of the disk. The two portions, taken together, provide the body of the ramp system. The ramp system can be positioned around the OD of the disk. This design is desirable as disk drives typically are configured to be able to utilize both surfaces of a magnetic disk by employing a separate slider for each.

Further embodiments are directed to disk drives for storing and retrieving magnetic data comprising a housing containing a rotatable magnetic disk, an actuator configured to pivot a load beam proximate to a surface of the disk, a slider and a tab each attached to the load beam, the tab extending the load beam in a first direction, and a ramp as described above. The ramp is situated such that the tab engages a sloped segment of the ramp as the load beam is pivoted to an outside diameter of the surface of the disk. Additional embodiments of the disk drive are directed to variations of the tab, and specifically to the surface of the tab that faces the ramp. This surface may have a non-planar component, for example, it can be concave or have an aerodynamic shape to help it glide on the air bearing. Shaping the surface of the tab can be an advantage in that it allows the tab to experience a greater lifting force from the air flow provided by the apertures beneath it.

Lastly, embodiments are directed to methods for loading and unloading a slider. Both methods include providing a rotatable magnetic disk disposed within a housing, providing an actuator disposed within the housing and configured to pivot a load beam proximate to a surface of the disk, providing a slider and a tab attached to the load beam wherein the tab extends the load beam in a first direction, and providing a ramp as described above. The method of loading the slider further includes rotating the magnetic disk to provide an air flow through the plurality of apertures, pivoting the load beam while the air flow through the apertures provides a lifting force to the tab as it moves with respect to the ramp from a straight segment to a sloped segment, and finally flying the slider such that the tab disengages from the ramp.

The method of unloading the slider further includes flying the slider over the disk, pivoting the load beam such that the tab engages a sloped segment of the ramp as the load beam is pivoted to an outside diameter of the disk, moving the tab over the sloped segment and onto the straight segment of the ramp, and reducing the rotation of the disk to reduce the flow of air through the apertures to allow the tab to be supported on the straight segment of the ramp. Further embodiments of both methods include supporting the tab on an air bearing while it is moving relative to the ramp. Other embodiments of both methods are directed to providing an amount of lift to the tab that is not sufficient to raise the tab off of the ramp, but is sufficient to lower the contact force between the tab and the ramp.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

FIGS. 1A, 1B, and 2–4 were discussed above with reference to the prior art.

Figure 5:
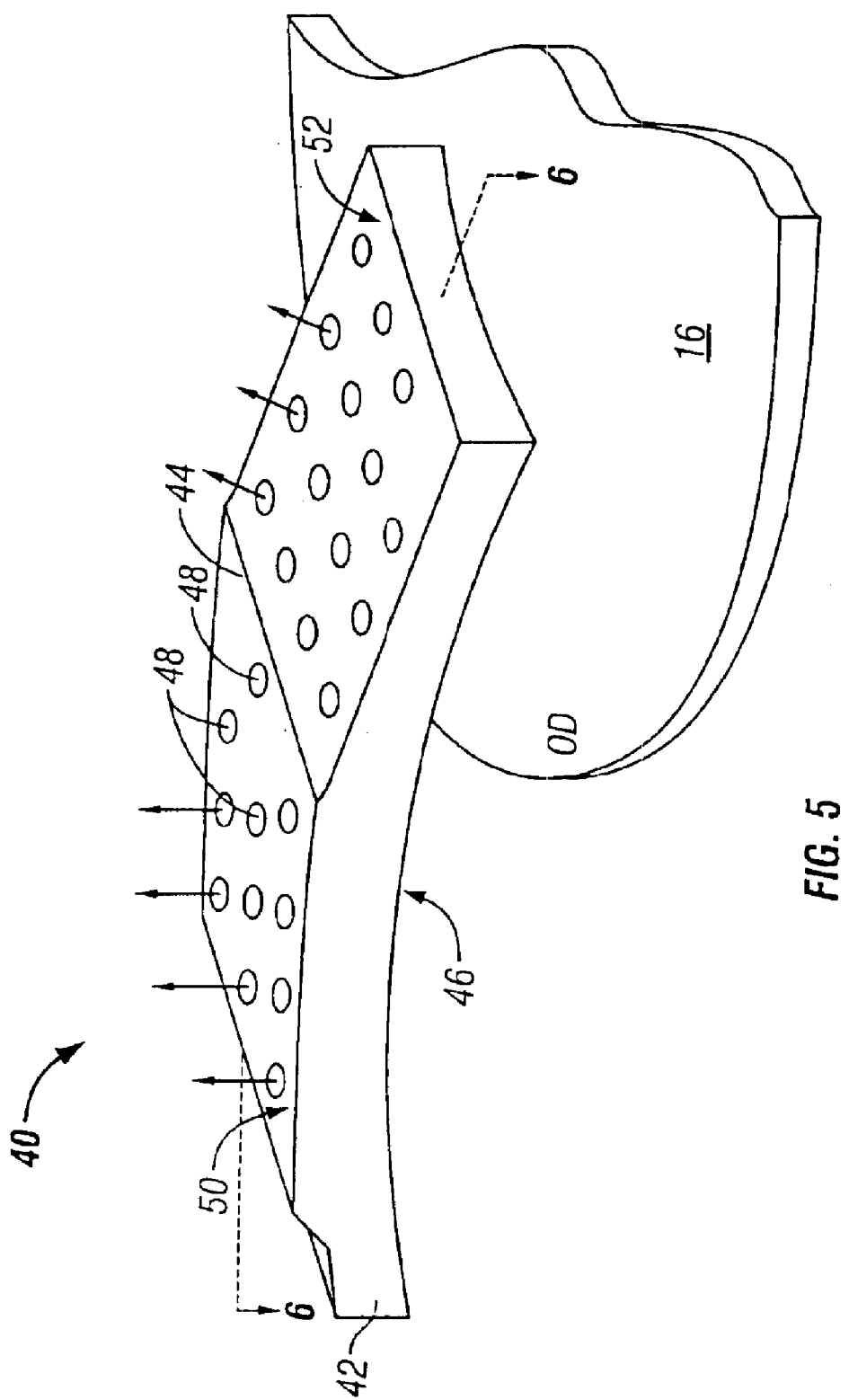
FIG. 5 is a perspective view of a ramp of the present invention.

FIG. 5 shows a perspective view of the ramp 40 of the present invention. The ramp 40 comprises a body 42 having a first surface 44 and a second surface 46 and a plurality of apertures 48 extending between the two. The body 42 is preferably formed of a plastic, such as Teflon, or plastic-like material selected for having very low levels of outgassing of volatile organic compounds and very low levels of particle shedding. The body 42 should also be formed of a material that is resistant to wear and that can be readily machined or otherwise formed. In some embodiments ceramic materials or metallic materials can be used to form the body 42. Further embodiments include surface treatments, lubricants, and specially formed solid surface layers to provide additional wear resistance to first surface 44.

The first surface 44 is further divided into two sections, a straight segment 50 and a sloped segment 52, the sloped segment 52 being acutely angled with respect to the second surface 46. The straight segment 50 is a location where a tab 32 rests when a slider 24 is parked. Although shown as flat in FIG. 5, the straight segment 50 in other embodiments can be provided with a notch, a step, or a depression, for example, to more securely hold the tab 32 when the slider 24 is at rest. Such designs are well known in the art. The sloped segment 52 provides a transition region to guide the slider 24 towards the surface of the disk 16 during loading, and to gently bring the slider 24 away from the surface of the disk 16 when unloading. While the sloped segment 52 is shown in FIG. 5 as being a flat section acutely angled with respect to the second surface 46, the sloped segment 52 take more complex forms in other embodiments. For example, the sloped segment 52 can be contoured so that towards one end it smoothly transitions into the straight segment 50 and on the other end it is flared to be more nearly parallel to the plane defined by the surface of the disk 16.

The ramp 40 is situated such that it partially overhangs the OD of the disk 16. As the disk 16 rotates, a layer of air proximate to the surface of the disk 16 is swept along with it. This flow of air is commonly known as windage. The air flow near the OD of the disk 16 is complex and will be affected in the vicinity of the ramp 40 both by the ramp 40 itself and by the presence of the nearby slider 24 and load beam 20. In general, however, the air flow near the OD has both radial and circumferential components, moving both towards the OD of the disk 16 and in the direction of the rotation of the disk 16. The second surface 46 can be shaped in order to better capture some of the air flow underneath the ramp 40. An advantageous shape of the second surface 46 can direct a greater portion of the air flow near the OD of the disk 16 into the plurality of apertures 48 so that more air will emerge through the first surface 44 as shown by the arrows in FIG. 5.

Figure 6A:
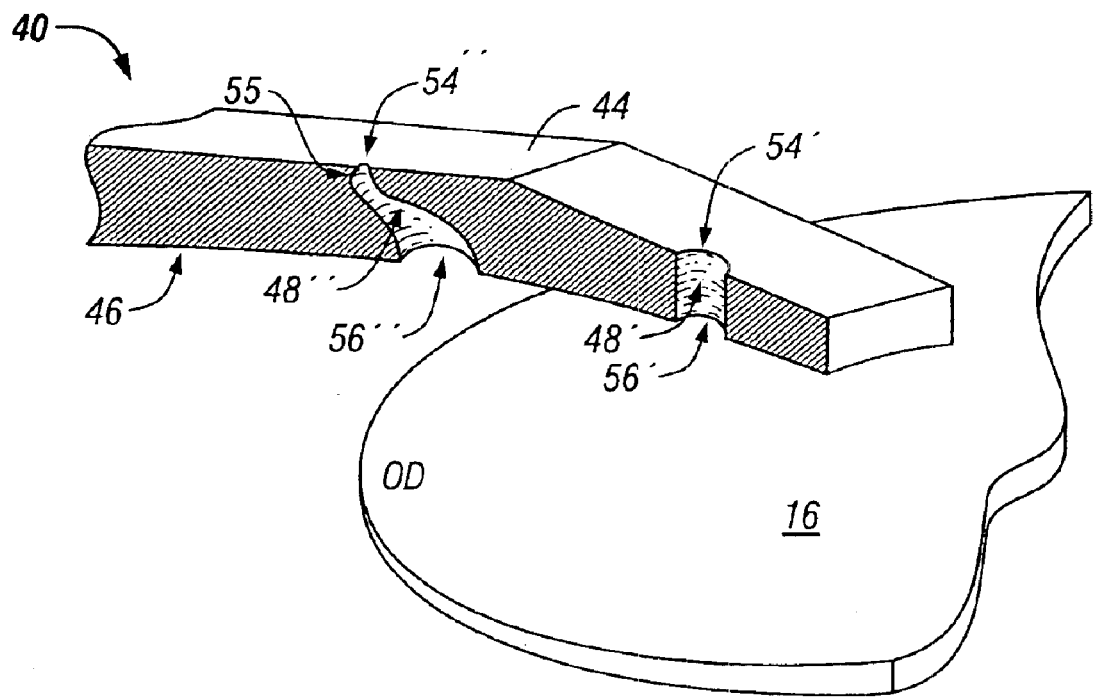
FIG. 6A is a partially broken view of the ramp of FIG. 5.

FIG. 6A shows a partially broken view of the ramp 40 taken along the line 6—6 of FIG. 5 to illustrate various embodiments of apertures 48. In one embodiment, an aperture 48' has a first opening 54' at the first surface 44 and a second opening 56' at the second surface 46. For this aperture 48' the cross-sectional areas of the first opening 54' and the second opening 56' are substantially equal and the aperture 48' between them is substantially straight and perpendicular to the second surface 46. Aperture 48' represents the simplest type of aperture 48 and should be the easiest to manufacture, for example, by laser drilling.

Aperture 48" shows a more complex aperture 48. Aperture 48" differs from aperture 48' in four ways: the cross-sectional area of the first opening 54" is less than the cross-sectional area of the second opening 56" the aperture 48" is neither straight nor perpendicular to the second surface 46, and the first opening 54" includes a nozzle region 55. Of course, other embodiments may be more complex than aperture 48' while less complex than aperture 48". For example, one embodiment of aperture 48 might be straight with a cross-sectional area of the first opening 54 less than the cross-sectional area of the second opening 56 and not include a nozzle 55.

Non-linear apertures 48 can be used to bring an air flow from a second opening 56 situated over the surface of the disk 16 to a first opening 54 on the first surface 44 that is substantially distant from the OD of the disk 16. In order to provide a flow of air to the straight segment 50, for example, it may be necessary to direct the flow of air from second openings 56, located proximate to the OD of the disk 16, through a plurality of apertures 48 and to first openings 54 located on the straight segment 50. Aperture 48" in FIG. 6A illustrates this configuration. Aperture 48" also illustrates a nozzle region 55 that is shaped to increase the speed of the air as it exits through the first opening 54".

Figure 6B:
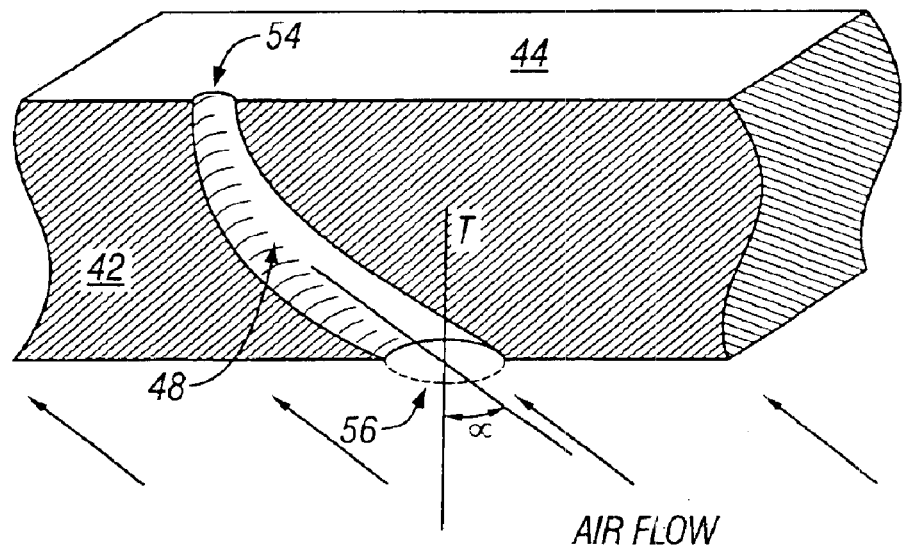
FIG. 6B is an elevational view of a cross-section of a portion of a ramp provided with an aperture.

FIG. 6B is an elevational view of a cross-section of a portion of a ramp provided with an aperture 48 that intersects the second surface 46 at an angle α to a tangent T of the second surface 46 at the location of the second opening 56. In some embodiments it is desirable to angle the apertures 48 at the second surface 46 to take advantage of an air flow that impinges on the second surface 46 at or near the angle α to the tangent T of the second surface 46.

Figure 7:
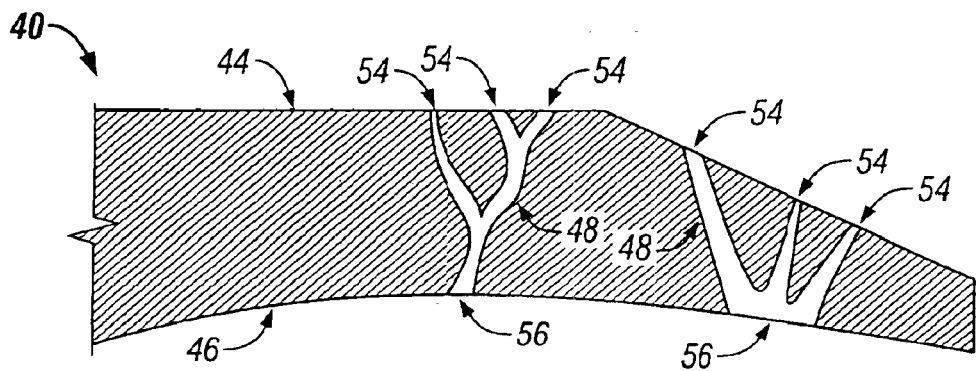
FIG. 7 is a cross-section of an alternative embodiment of a ramp showing a branching of apertures.

Other embodiments of apertures 48 involve branching. For example, the second opening 56 can connect to a plurality of first openings 54. FIG. 7 illustrates two of many possible ways in which such branching can occur. In one embodiment, several apertures 48 lead away from one second opening 56. In another embodiment, a single aperture 48 splits into two apertures 48, one of which splits again into two more apertures 48. In both illustrated embodiments three first openings 54 connect to one second opening 56, however in other embodiments two first openings 54 connect to one second opening 56 and in still other embodiments more than three first openings 54 connect to one second opening 56. Yet other embodiments are directed to a ramp 40 where the plurality of apertures 48 includes a selection from amongst the various types of apertures 48 described above. Computer modeling, such as by computational fluid mechanics and computational structural mechanics, can be employed to determine optimal numbers, arrangements, shapings and sizes of the apertures 48, as will be appreciated by those skilled in the art.

Figure 8A:
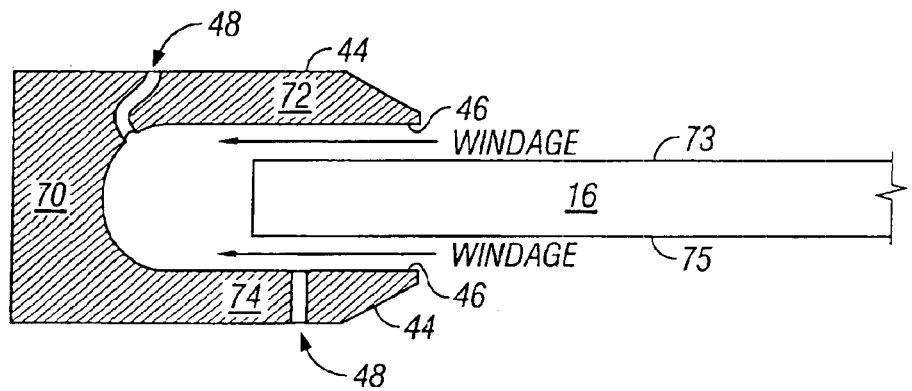
FIG. 8A is a cross-section of a ramp system of the present invention for one disk.
Figure 8B:
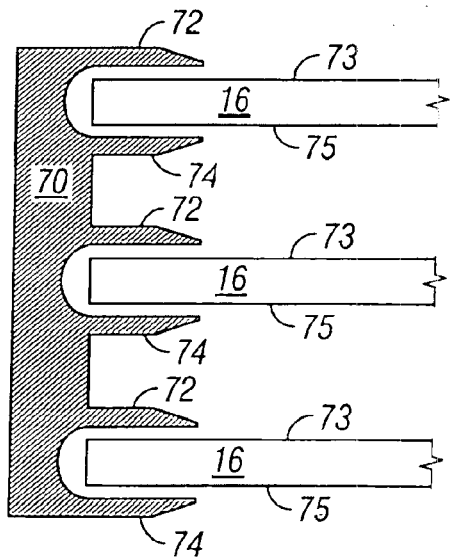
FIG. 8B is a cross-section of a ramp system of the present invention for a disk stack.

FIG. 8A shows a cross-section of a ramp system 70 of the present invention that allows for the simultaneous loading and unloading of two sliders 24 on one disk 16. The ramp system 70 includes a body having a first portion 72 and a second portion 74, each portion 72 and 74 including a first surface 44, a second surface 46, and a plurality of apertures 48 extending between them. The first portion 72 is proximate to a first surface 73 of the disk 16 and the second portion 74 is proximate to a second surface 75 of the disk 16. Each portion 72 and 74 is essentially an independent ramp 40. Since most disk drive systems 10 employ disks 16 having magnetic layers on both surfaces 73 and 75 they also include two sliders 24 attached to independent load beams 20 operated by a single actuator 18. A ramp system 70 allows the sliders 24 on both sides of the disk 16 to be loaded and unloaded with all of the advantages of the present invention. In disk drive systems 10 having more than one disk 16, frequently referred to as a disk stack, the ramp system 70 can be built to provide a ramp 40 for each surface 73 and 75 of each disk 16 as shown in FIG. 8B.

A further benefit of a ramp system 70 is that second surface 46 can be contiguous with the two portions 72 and 74. Since much of the windage moves in a radial direction as shown in FIG. 8A, the U-shaped portion of the second surface 46 will tend to block the flow of air and direct it instead into the plurality of apertures 48 in the first and second portions 72 and 74. It should be noted that although shown as U-shaped, this portion can take other forms as well such as a squared-off shape or a V-shape.

Figure 9:
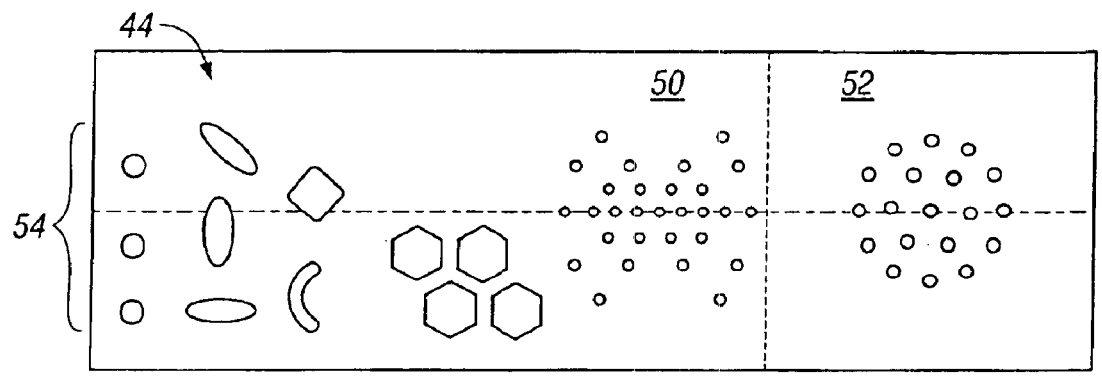
FIG. 9 is a plan view of the ramp showing various first opening shapes and arrangements.

FIG. 9 shows a plan view of a ramp 40 to illustrate that first openings 54 may have various shapes. These shapes may reflect the cross-sectional shapes of the apertures 48 extending into the ramp 40, or they may be formed only at the first surface 44. Such shapes include, but are not limited to, circles, squares and diamonds, ovals or ellipses having different ratios of major to minor axes, commas, and hexagons. Hexagons, for example, are preferably arranged to form a honeycomb structure. The apertures 48 can be arranged in a lattice, such as illustrated by the hexagonal arrangement of the hexagons in FIG. 9, or they can be arranged in concentric circles as shown on the sloped segment 52, or arranged such that the density of first openings 54 is greatest along the center line of the first surface 44. Many other arrangements are also possible. Similarly, second openings 56 on the second surface 46 can also take any of these shapes or arrangements.

Figure 10A:
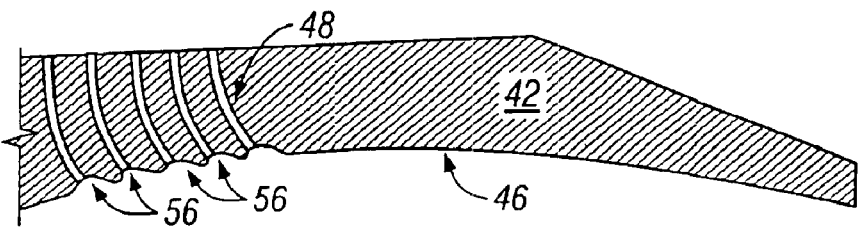
FIG. 10A is a cross-section of an alternative embodiment of the ramp of the present invention.
Figure 10B:
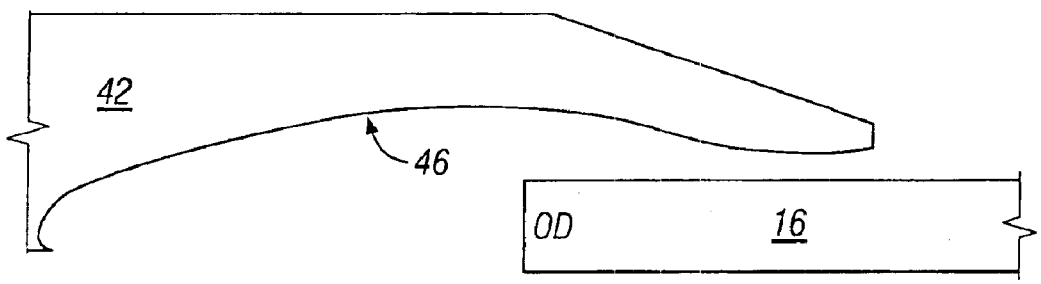
FIGS. 10B and 10C are side elevational views of alternative embodiments of the ramp of the present invention.
Figure 10C:
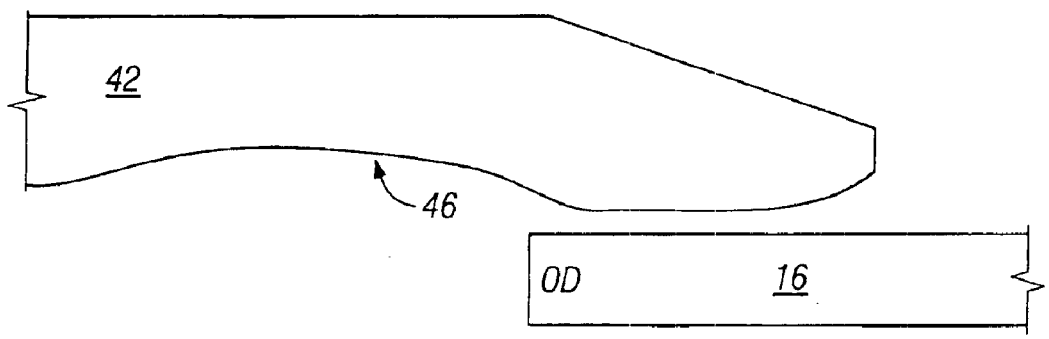

FIGS. 10A–10C show ramp embodiments 40 having second surfaces 46 that are specially shaped to direct air into second openings 56. In FIGS. 10A and 10B the second surface 46 is essentially concave. In FIG. 10A the second surface is further made wavy, grooved, or corrugated so that second openings 56 can be angled to face into the air flow as shown. FIG. 10B shows a second surface 46 that curves below the level of the edge of the disk 16 to better collect the air flow coming off of the disk 16 and urge it into second openings 56. FIG. 10C shows a more aerodynamically shaped second surface 46 that extends downward over the disk 16 to narrow the gap between the ramp 40 and the disk 16 to increase the speed of the air flow through this gap.

Figure 10D:
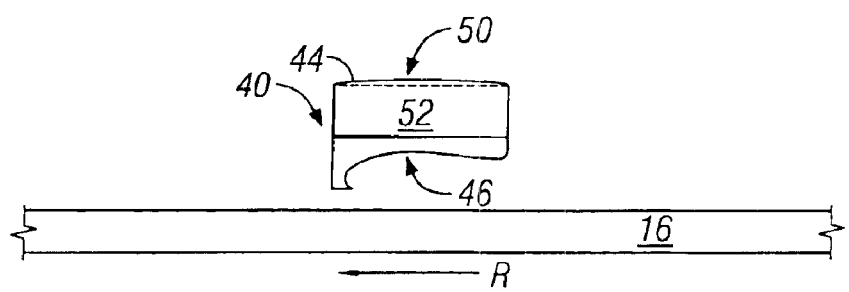
FIG. 10D shows an elevational view of the ramp situated above the disk to show how the second surface may be shaped along the minor axis of the ramp.

FIG. 10D shows an elevational view of a ramp embodiment 40 as seen from a point located over the center of the disk 16. This perspective shows that the second surface 46 can be shaped along a minor axis of the ramp 40 as well as along a major axis of the ramp 40 as shown in FIGS. 10A–10C. In FIG. 10D the shaping of the second surface 46 along the minor axis of the ramp 40 is concave. However, in other embodiments the second surface 46 can be flat or convex along the minor axis. In still other embodiments the second surface has grooves or channels set along the minor axis, with such grooves or channels extending substantially in the direction of the major axis of the ramp 40. Computer modeling, such as by computational fluid mechanics and computational structural mechanics, can be employed to design the shape of the second surface 46 for a given air flow around the disk 16, as will be appreciated by those skilled in the art. Also shown in FIG. 10D is that the straight segment 50 and the sloped segment 52 can be made convex rather than flat to further reduce the contact area between the tab 32 and the ramp 40 if ever they should touch.

Figure 11:
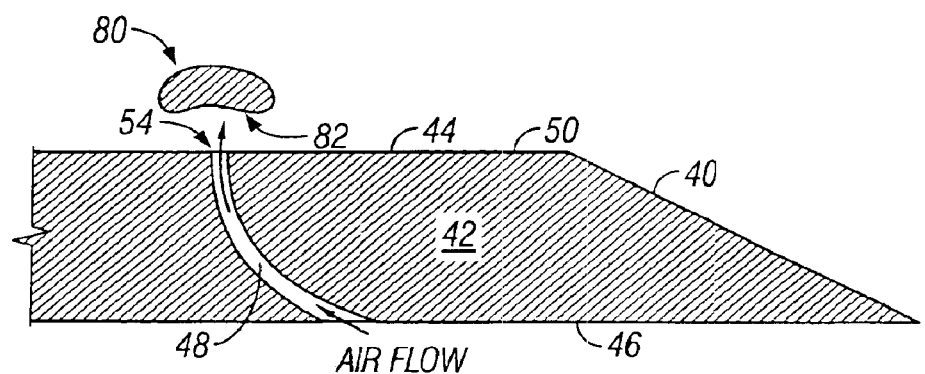
FIG. 11 shows a cross-section of the tab of the present invention disposed over the ramp.

FIG. 11 shows a cross-section of a tab 80 positioned over the straight segment 50 of a ramp 40. Tab 80 varies from tab 32 of the prior art shown in FIG. 4 in that tab 80 has a shape designed to take advantage of the flow of air out of first openings 54 to generate lift. The shape of tab 80 in FIG. 11 is essentially concave on the surface 82 that faces the ramp 40. Just as with the second surface 46 of the ramp 40, the surface 82 of the tab 80 can be shaped along one or two axes. Hence, the concavity shown in FIG. 11 may represent either a section through a cylinder, a section through a hemispherical cap, or a section through a surface that is partially cylindrical and partially hemispherical. A cylindrical shape to the surface 82 would produce two lines of contact with the first surface 44 when the tab 80 is touching the ramp 40. A hemispherical shape to the surface 82 would produce a circular line of contact with the first surface 44 when the tab 80 is touching the ramp 40. Where the first surface 44 is convex, such as shown in FIG. 10D, either a cylindrical shape or a hemispherical shape to surface 82 would produce simply two points of contact with the first surface 44 when the tab 80 is touching the ramp 40.

Tab 80 is preferably formed of a plastic, such as Teflon, selected for having very low levels of outgassing of volatile organic compounds and very low levels of particle shedding. The tab 80 should also be formed of a material that is resistant to wear and that can be readily machined or otherwise formed. In some embodiments ceramic materials or metallic materials can be used to form the tab 80. Further embodiments include surface treatments or specially formed solid surface layers to provide additional wear resistance to the surface 82. Tab 80 can be made thin to minimize mass, as the air flow coming out of first openings 54 is intended to lift the tab 80 off of the first surface 44 of the ramp 40. Minimizing mass to make lifting the tab 80 easier also suggests forming the tab 80 from a low-density material. Additionally, the tab 80 can be made wider in a direction parallel to the long axis of the ramp 40, compared with tabs 32 of the prior art, in order to be situated over a greater number of first openings 54 at any given moment.

Figure 12:
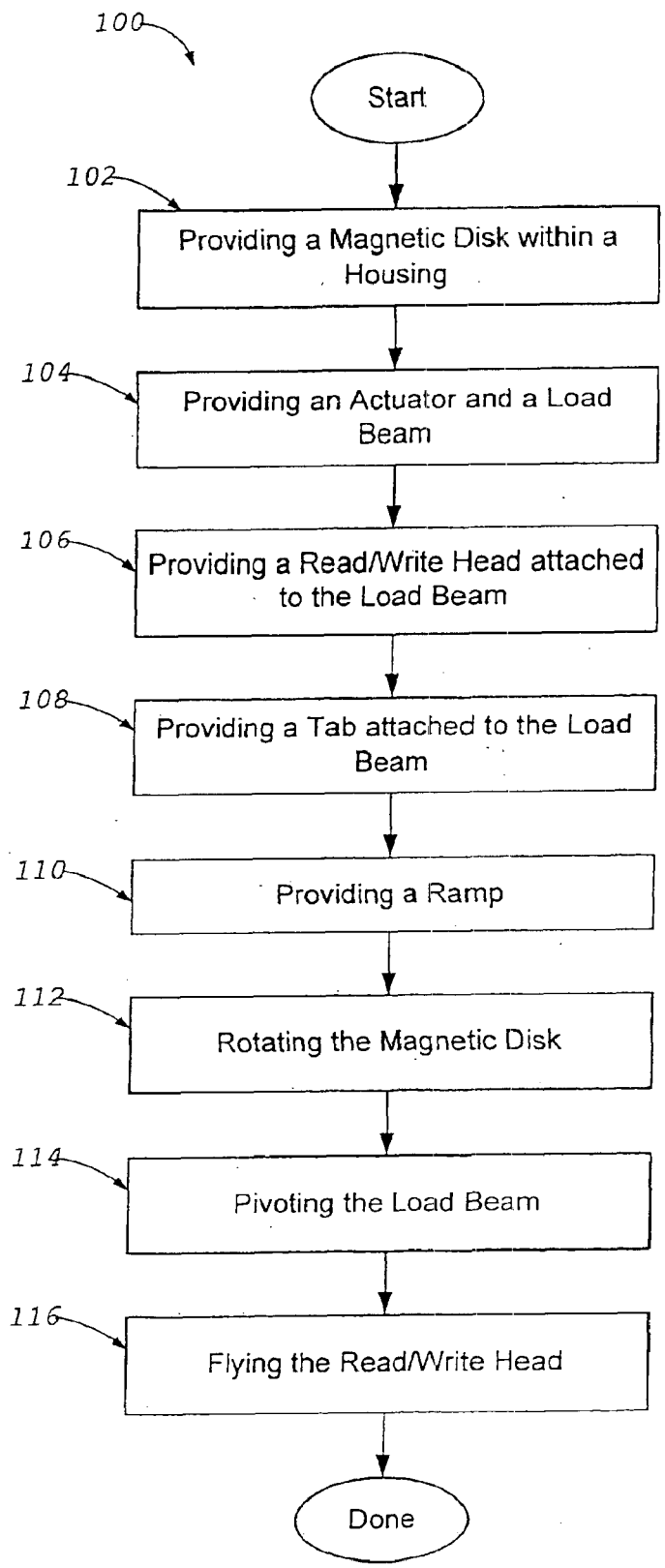
FIG. 12 shows a flow diagram for the method of loading the slider.

FIG. 12 shows a flow chart illustrating the process 100 for loading a slider 24 according to the present invention. The process 100 includes the act or operation 102 of providing a magnetic disk 16 within a housing 12, the act or operation 104 of providing an actuator 18 and a load beam 20, where the actuator 18 is configured to pivot the load beam 20 proximate to the surface of the disk 16, the act or operation 106 of providing a slider 24 attached to the load beam 20, the act or operation 108 of providing a tab 80 attached to the load beam that extends the load beam in a first direction, and the act or operation 110 of providing a ramp of the present invention. The process 100 further includes the act or operation 112 of rotating the disk 16, the act or operation 114 of pivoting the load beam 20, and the act or operation 116 of flying the slider 24.

Figure 1A:
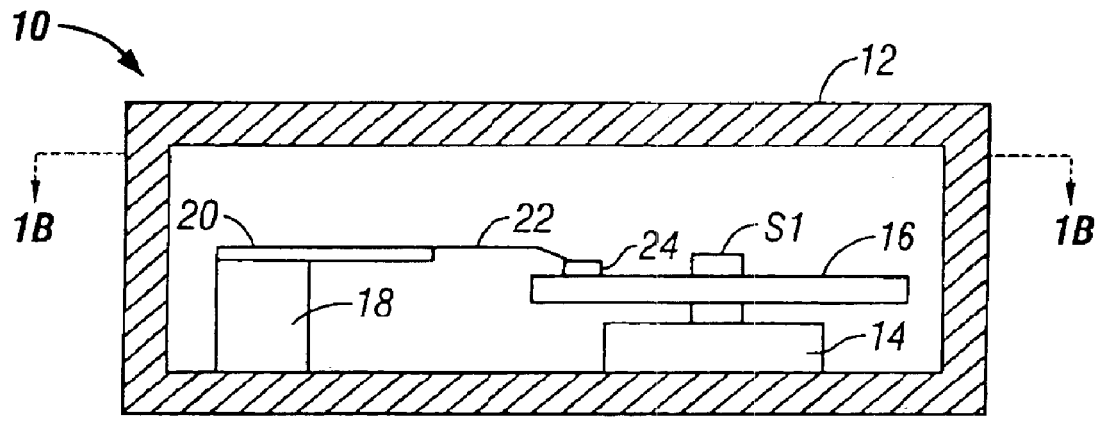
FIG. 1A is a partial cross-sectional elevation view of a magnetic data storage system of the prior art.
Figure 1B:
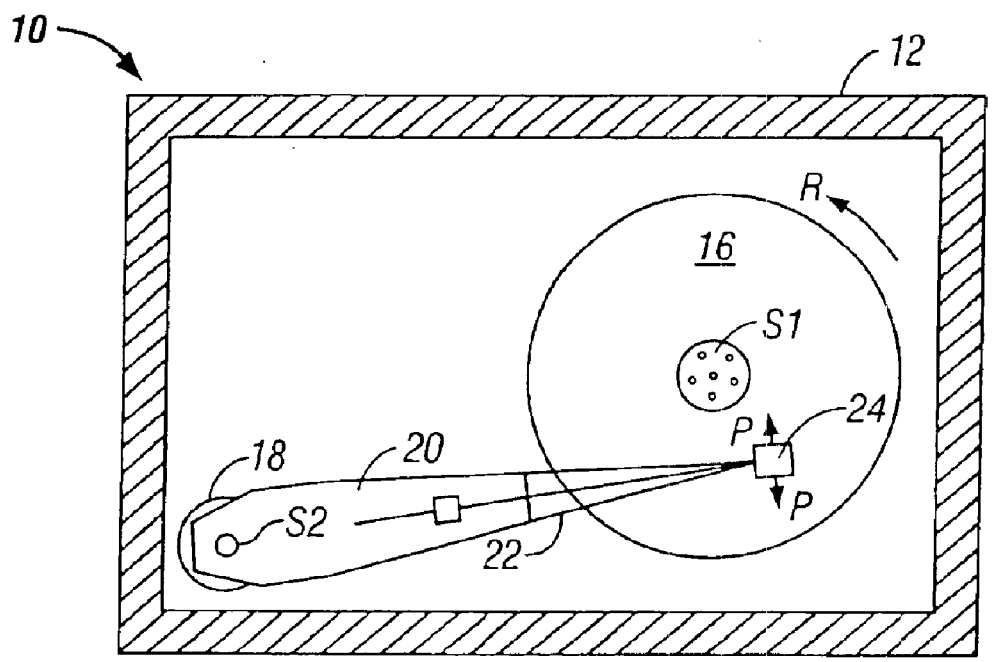
FIG. 1B is a top plan view of the magnetic data storage system taken along line 1B—1B of FIG. 1A.
Figure 2:
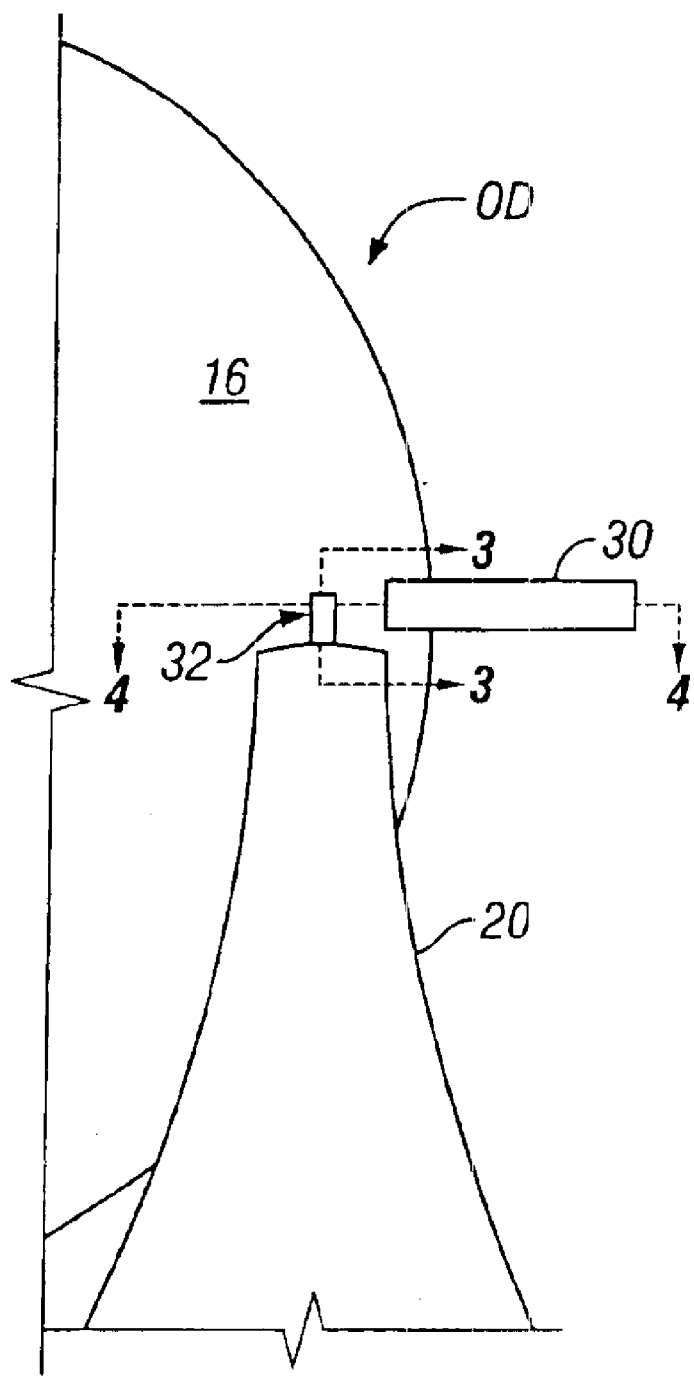
FIG. 2 is a top plan view of a magnetic data storage system equipped with a ramp and a tab of the prior art.
Figure 3:
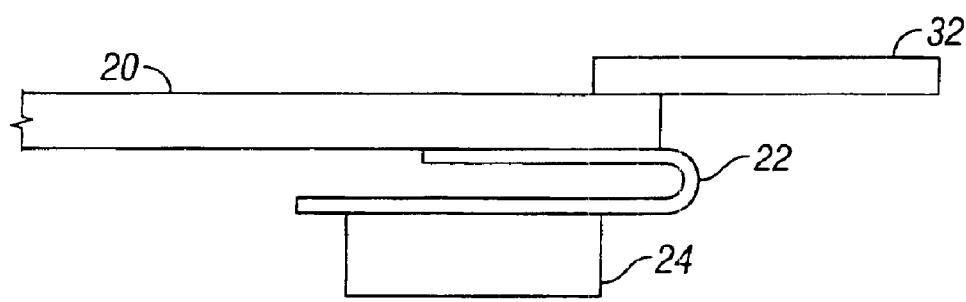
FIG. 3 is an elevational view taken along the line 3—3 of FIG. 2
Figure 4:
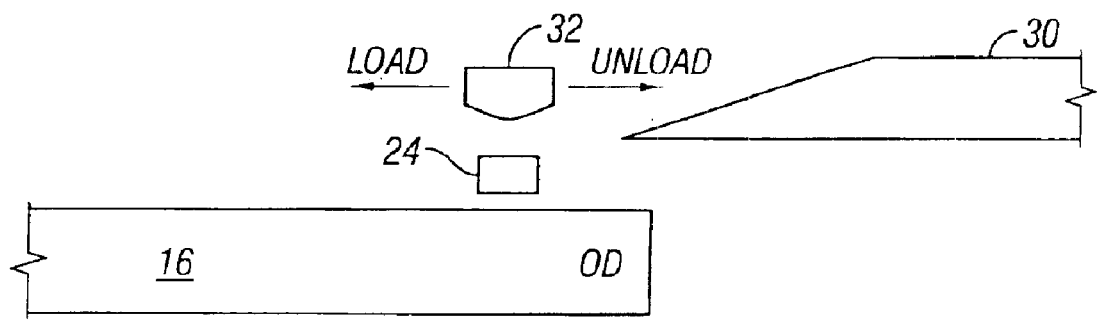
FIG. 4 is an elevational view taken along the line 4—4 of FIG. 2.

Acts or operations 102, 104, and 106 are all well known in the prior art. Act or operation 108 involves providing a tab 80 attached to the load beam 20. While a tab 80 of the present invention is preferable, it should be noted that a tab 32 of the prior art can also be used. It should also be pointed out that in preferred embodiments the tab 80 or 32 will be integral to the load beam 20 rather than a separate piece that has been joined to the load beam 20. The tab 80 is intended to extend the load beam 20 in a first direction, where the first direction is defined as the long axis of the load beam 20. Extending the load beam 20 in a first direction with a tab 32 that is integral to the load beam 20 is also well known in the prior art and is shown in FIGS. 2 and 3. It should also be noted that although the tab 32 in FIG. 3 is shown as projecting out from the top surface of the load beam 20, the tab 32 or a tab 80 can also be extended from the end of the load beam 20, or extended from the flexure 22. The tab 80 needs to extend sufficiently beyond the end of the load beam 20 so that when the tab 80 engages the ramp 40 neither the flexure 22 nor the slider 24 contacts the ramp 40.

In act or operation 110 a ramp 40 of the present invention is provided. The ramp 40 should be positioned such that as the actuator 18 pivots the load beam 20 towards the OD of the disk 16 the tab 80 engages the ramp 40. The ramp 40 should be rigidly attached to the housing 12, or to another component within the system 10 that itself is rigidly attached to the housing 12, so that the ramp 40 can be securely positioned proximate to a surface of the disk 16 at the OD. The ramp 40 should be proximate to the surface of the disk 16, but not so close that a sudden jolt or shock could cause the ramp 40 to contact the disk 16. In act or operation 110 the ramp should be further positioned so that the tab 80 is in contact with the straight segment 50 of the first surface 44.

Act or operation 112 involves rotating the disk 16 in order to provide a flow of air through the plurality of apertures 48. Since the amount of air flowing through the plurality of apertures 48 is proportional to the speed of the disk 16, and the lifting force felt by the tab 80 is proportional to the amount of air flowing through the apertures 48, it is therefore desirable to spin the disk 16 to its operating rotational rate, or nearly so, in act or operation 112. At a minimum, however, the disk 16 should be spinning at least as fast as is required to fly the slider 24. Preferably, the air flow through the plurality of apertures 48 in act or operation 112 is sufficient to lift the tab 80 completely off of the straight segment 50 of the ramp 40. However, even if the air flow is not sufficient to lift the tab 80 completely off of the straight segment 50, any air flow at all will provide some benefit by reducing the contact force between the tab 80 and the ramp 40, thus reducing the rate with which contamination is generated through wear.

Act or operation 114 involves pivoting the load beam 20, including the tab 80 and the slider 24 attached thereto, so that the tab 80 moves from a straight segment 50 of the ramp 40 to a sloped segment 52 of the ramp 40. Ideally, the tab 80 should be supported on an air bearing provided by the air flow through the plurality of apertures 48 as the load beam 20 is pivoted by the actuator 18. In some embodiments, however, the air flow is only sufficient to lift the tab 80 off of the ramp 40 over a limited portion of the range of motion in act or operation 114, and in still other embodiments the tab remains in sliding contact through the entire act or operation.

Act or operation 116 involves flying the slider 24 over the surface of the disk 16 so that the tab 80 disengages from the ramp 40. More specifically, as actuator 18 pivots the load beam 20 in the direction of the ID of the disk 16, the tab 80 follows the contour of the ramp 40 as it moves along the sloped segment 52. As the tab 80 nears the end of the sloped segment 52 the slider 24 comes ever closer to the surface of the disk 16 and encounters an ever increasing flow of air proximate to the surface of the disk 16. This flow of air provides lift to the slider 24. The lift felt by the slider 24 is transferred to the flexure 22, the load beam 20, and ultimately to the tab 80.

In the prior art, the lift transferred to the tab 32 had to be sufficient to overcome attractive forces tending to hold the tab 32 against the surface of the ramp 30 before the tab 32 would disengage from the ramp 30. However, in act or operation 116 of the present invention the tab 80 is supported off of the first surface 44 by a cushion of air so that the attractive forces between the ramp 40 and the tab 80 are minimized or eliminated. Consequently, unlike the prior art, in a preferred embodiment of process 100 there is not a sharp transition at the moment when the tab 80 separates from the ramp 40. Instead, in act or operation 116 the transition as the tab 80 disengages the ramp 40 is smooth and gradual as the slider 24 gains the necessary lift to fly over the surface of the disk 16. In embodiments of act or operation 114 in which the tab 80 is in sliding contact with the ramp 40 at the time act or operation 116 begins, the transition in act or operation 116 may be abrupt as in the prior art. However, the lift provided to the tab 80, even if insufficient to raise the tab 80 off of the ramp 40 prior to the end of act or operation 114, can still reduce the magnitude of the jolt experienced by the slider 24 as the tab 80 disengages in act or operation 116.

Figure 13:
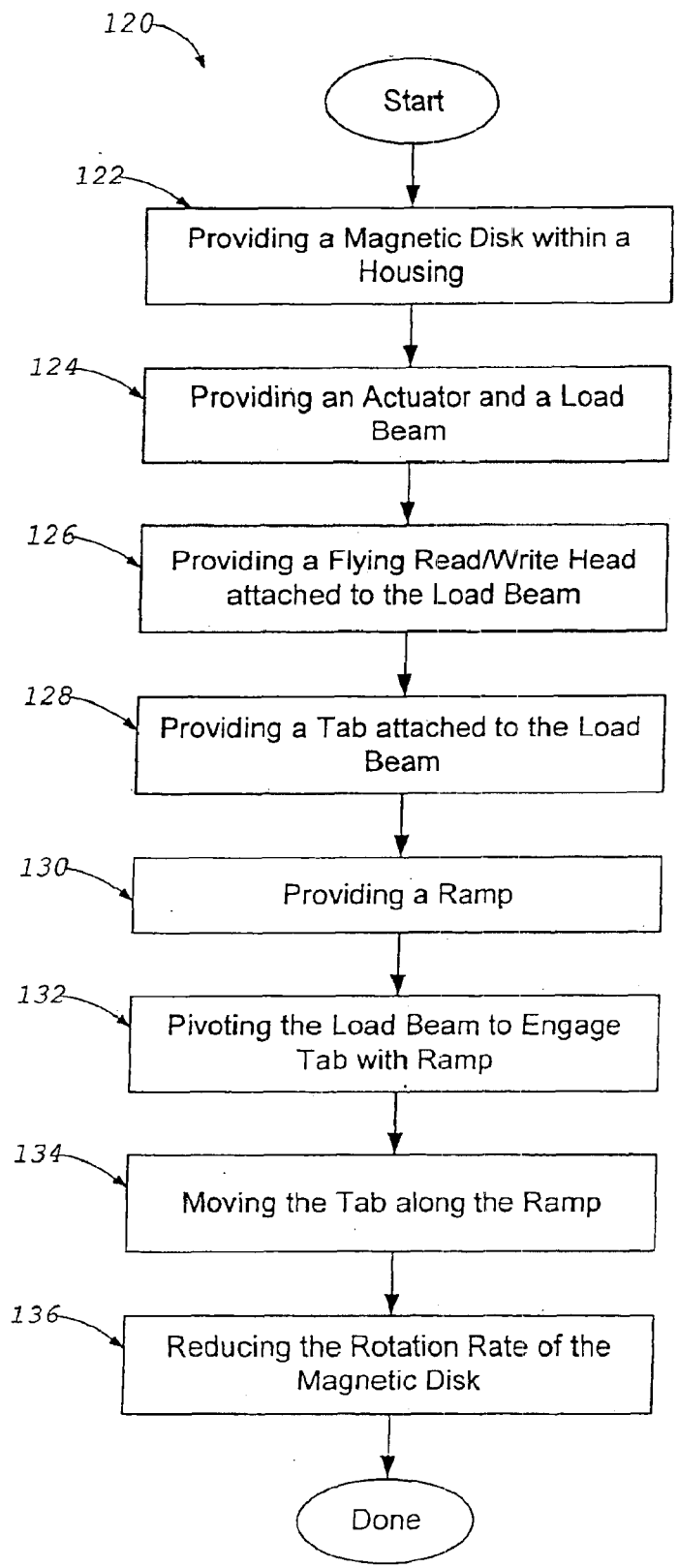
FIG. 13 shows a flow diagram for the method of unloading the slider.

FIG. 13 shows a flow chart illustrating the process 120 for unloading a slider 24 according to the present invention. The process 120 includes the act or operation 122 of providing a spinning magnetic disk 16 within a housing 12, the act or operation 124 of providing an actuator 18 and a load beam 20, where the actuator 18 is configured to pivot the load beam 20 proximate to the surface of the disk 16, the act or operation 126 of providing a slider 24 attached to the load beam 20 that is flying over the surface of the disk 16, the act or operation 128 of providing a tab 80 attached to the load beam that extends the load beam in a first direction, and the act or operation 130 of providing a ramp of the present invention such that the rotating disk 16 provides a flow of air through the plurality of apertures 48. The process 100 further includes the act or operation 132 of pivoting the load beam 20 to engage tab 80 with ramp 40, the act or operation 134 of moving the tab 80 along the ramp 40, and the act or operation 136 of reducing the rotation rate of the disk 16.

Acts or operations 122, 124, and 126 are all well known in the prior art. Act or operation 128 involves providing a tab 80 attached to the load beam 20 and is essentially the same as act or operation 108 described above. In act or operation 130 a ramp 40 of the present invention is provided, where the rotating disk 16 provides a flow of air through the plurality of apertures. The ramp 40 should be positioned as described in act or operation 110 except that the tab 80 will not be engaged with it.

Act or operation 132 involves pivoting the load beam 20, including the tab 80 and the slider 24 attached thereto, such that the tab 80 engages a sloped segment 52 of the ramp 40 as the load beam 20 is brought to the OD of the disk 16. The flow of air through the apertures 48 can serve to cushion the engagement, gently guiding the tab 80 onto the sloped segment 52, in contrast to the prior art in which the tab 32 simply collided with the ramp 30. It will be appreciated by one skilled in the art that gently guiding the tab 80 onto the sloped segment 52 will tend to preserve the surface of the ramp 40 and reduce the amount of wear and contamination generated by engaging the tab 80 with the ramp 40.

Act or operation 134 is directed to moving the tab 80 over the sloped segment 52 and then onto the straight segment 50 of the ramp 40. Ideally, the flow of air through the plurality of apertures 48 provides a lifting force to the tab 80 that is sufficient to keep the tab 80 separated from the ramp 40 by an air bearing as the tab 80 moves across sloped segment 52 and onto straight segment 50. However, even if the lift provided to the tab 80 is insufficient to maintain a separation between the tab 80 and the ramp 40 during act or operation 134, it can still reduce the magnitude of the contact force between them and thereby reduce wear and contamination.

Act or operation 136 involves reducing the rotation rate of the disk 16, thereby reducing the flow of air through the plurality of apertures 48 so that the lifting force experienced by the tab 80 is reduced. As the lifting force diminishes the tab 80 gently sets down on the straight segment 50 of the ramp 40. Once the disk 16 slows sufficiently and the air flow through the plurality of apertures 48 has stopped the slider 24 is said to be parked.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A disk drive for storing and retrieving data, comprising:
a housing;
a rotatable magnetic data storage disk disposed within said housing;
an actuator disposed within said housing and configured to pivot a load beam proximate to a surface of said magnetic disk;
a slider attached to said load beam;
a tab attached to said load beam, said tab extending from said load beam in a first direction; and
a ramp disposed within said housing, said ramp including a ramp body having a first surface away from the disk and a second surface facing the disk and at least one aperture extending between said first surface and said second surface, wherein said aperture has at least one air outflow opening at said first surface and at least one an air inflow opening at said second surface, said ramp being situated such that said tab engages a sloped segment of said ramp as said load beam is brought to an outside diameter of said surface of said magnetic disk.

2. The disk drive of claim 1 wherein said tab has a tab surface facing said ramp, said tab surface having a non-planar component.

3. The disk drive of claim 1 wherein said tab has a tab surface facing said ramp, said tab surface having an aerodynamic shape.

4. The disk drive of claim 1 wherein said tab has a tab surface facing said ramp, said tab surface being concave.

5. The disk drive of claim 1 wherein cross-sectional areas of said air inflow and air outflow openings are substantially equal.

6. The disk drive of claim 1 wherein a cross-sectional area of said air outflow opening is less than a cross-sectional area of said air inflow opening.

7. The disk drive of claim 1 wherein said at least one aperture intersects said second surface at an angle to a tangent of said second surface at said air inflow opening.

8. The disk drive of claim 1 wherein said at least one aperture has an air outflow opening within a straight segment of said first surface.

9. The disk drive of claim 1 wherein said at least one aperture has an air inflow opening that connects to more than one air outflow opening.

* * * * *